Nov. 4, 1958  C. F. AFANADOR  2,858,913
BRAKE DRUM

Filed March 8, 1957

INVENTOR.
CARLOS F. AFANADOR
BY
John D. Hansen
ATT'Y

United States Patent Office 2,858,913
Patented Nov. 4, 1958

2,858,913

BRAKE DRUM

Carlos F. Afanador, Troy, Ohio, assignor to The B. F. Goodrich Company, New York, N. Y., a corporation of New York Application March 8, 1957, Serial No. 644,870

4 Claims. (Cl. 188—218)

This invention relates to brakes, and more particularly to an improved brake drum structure which is especially suitable for high energy brakes for modern aircraft and the like.

The brake drum structure of this invention is characterized by exceptional structural rigidity and dimensional stability of its braking surface (both axially and diametrically) during braking operations. In particular, the drum structure is resistant to distortion in the form of expansion or "bell mouthing" of the open end of the drum during high energy braking, which is one of the major factors contributing to brake fade. Additionally, it is resistant to the objectionable shrinking of the open end to a smaller diameter than the diameter to which the drum is initially shaped and/or to warping into oval shapes. The latter forms of distortion frequently occur in conventional brake drums after the drums have cooled following a high energy stop. The drum construction also minimizes cracking and checking of the braking surface of the drum by providing for stress relief in the body of the drum when the drum undergoes thermal expansion.

In general, these results are accomplished by slotting the cylindrical flange portion of the brake drum into its open end to divide this flange portion into a plurality of circumferentially-spaced flange segments, and confining these segments adjacent the open end of the flange so that during braking the segments expand circumferentially of the flange but resist radial distortion. The segments are confined to resist radial distortion by an annular rigid ring which is frictionally interlocked with the edges of the segments at the open end of the drum but which does not inhibit expansion of the segments circumferentially. Preferably one or more hoop-like members surround the segments and cooperate with the annular ring to oppose radial distortion and warpage of the segments.

The invention will be further described with reference to the accompanying drawing which illustrates one specific brake drum construction made in accordance with and embodying this invention.

Figure 1:
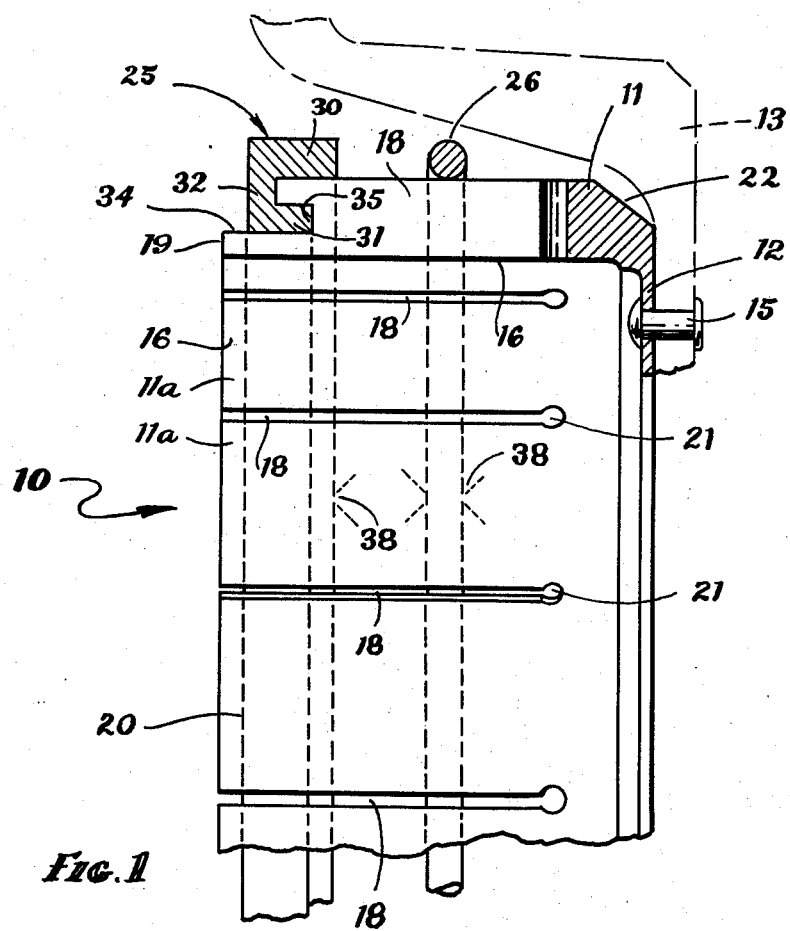
Fig. 1 is fragmentary radial sectional through the brake drum.

In the illustrated embodiment of the invention, the brake drum structure 10 includes a generally cylindrical braking flange 11 and an integral radial mounting flange 12 by which the brake drum is fastened to an adjoining wheel 13 by a suitable fastener 15. The braking flange 11 has an internal cylindrical braking surface 16 which is engageable by friction members of the particular brake mechanism (not shown) associated with the drum and wheel. Preferably the brake drum is steel.

In accordance with this invention the braking flange 11 is provided with a plurality of radial slots 18 opening into said brake flange from the edge 19 at the open end 20 of the brake drum. The slots 18 extend transversely and generally axially of the braking flange 11 through its radial thickness and terminate in circular holes 21 somewhat wider than the slots adjacent a shoulder portion 22 of the drum at the function of the mounting flange 12 and braking flange 11. The slots divide the braking flange 11 into a plurality of circumferentially spaced arcuate cantilever flange segments 11a, each joined to and supported by the shoulder portion 22. The ends of the segments 11a at the open end 20 of the braking flange 11 are interconnected by an annular ring 25 which encircles the outer margin of the open end of the braking flange 11. Additionally, the braking flange 11 is snugly encircled exteriorly by a rigid hoop 26 located intermediate the ring 25 and the shoulder portion 22 of the drum. Preferably the ring 25 and hoop 26 are steel.

As indicated in the drawings, the ring 25 is generally C-shaped in cross-section. Structurally it includes an upper leg 30 and a lower leg 31 interconnected by a radial central portion 32. The ring 25 fits into an annular rabbet 34 at the outer peripheral corner of the open end of the braking flange with the lower leg 31 projecting into an annular groove 35 in rabbet 34 and with the upper leg 30 embracing the outer peripheral surface of the braking flange. Preferably the ring 25 is pressed into the rabbet 34 so that the lower leg 31 of the ring is seated snugly in the groove.

The hoop 26 is of circular cross-sectional shape and is preferably pressed over the braking flange 11 to the position shown. If desired, both the hoop 26 and the ring 25 may be tack welded as indicated at numeral 38 to one or several of the segments 11a at the circumferential midpoint of each segment to keep the ring and hoop in position. Welds 38 are made at the midpoint of the segments so that the welds do not inhibit the circumferential expansion of the segments.

Figure 2:
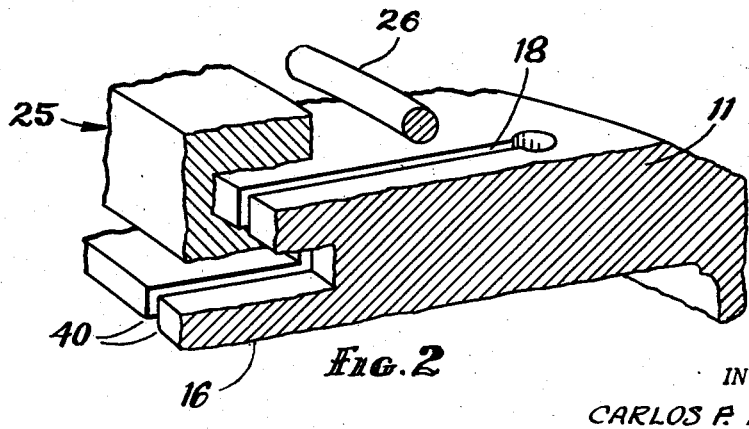
Fig. 2 is a fragmentary perspective view of a portion of the drum viewed from its open end.

Preferably the slots 18 are spaced apart circumferentially of the braking flange 11 a distance somewhat less than the arcuate length of the shortest friction member of the brake to be engaged with the friction face of the drum. The width of the slots is such that collectively they can accommodate the total circumferential expansion of the braking flange 11 under the braking conditions for which the drum is designed. Preferably the corners of the slots at the braking surface 16 are rounded as at numeral 40 (see Fig. 2) to avoid any possibility of cutting the friction lining material of the brake members.

When the brake is applied, the braking flange 11 acts as a heat sink for the heat generated at the braking surface 16. Owing to the slotted construction of the braking flange 11 and the manner in which ring 25 is engaged with the flange segments 11a, the thermal expansion occurring in the braking flange is principally manifested by a lateral expansion of the flange segments circumferentially of the braking flange 11 to narrow the width of the slots 18. The ring 25 undergoes very little circumferential expansion because even though the radially inner part of the ring tends to expand circumferentially as a result of heating by conduction from the flange segments, this expansion is mechanically opposed by the outer leg 30 of the ring which not only is more massive than the inner leg portion 31 but also is remote from the braking surface 16 and therefore undergoes much smaller temperature change during braking than the inner leg 31. The comparatively small thermal expansion of ring 25 tends to accommodate the radial expansion of the flange segments.

The ring 25 provides mechanical resistance to the radial pressure force of the braking members against the braking surface 16 and thus provides resistance to belling of the open end of the brake drum from this force as well as from the thermal expansion of the braking flange. The hoop 26 provides additional mechanical resistance to the radial braking force.

Checking and cracking of the braking surface 16 is materially minimized in this construction because each flange segment 11a may expand circumferentially in accordance with the radial temperature gradient through the segment. Thus the increments of thickness of each flange segment near the braking face 16 may expand circumferentially to a greater extent than those nearer the external surface of the braking flange, the slots 18 thereby assuming a modified V-shape. As a result the metal at the braking surface of the flange is not subjected to loads beyond its elastic limit which leads to checking and cracking.

When the brake drum cools to ambient temperature following a high energy braking stop, the ring 25, by virtue of its interlocked connection with the edges of the flange segments 11a, prevents these segments from warping radially inward and otherwise preserves the cylindrical shape of the braking flange 11. The ring 25 itself is highly resistant to warpage because of inherent rigidity provided by its C-shape configuration. The hoop 26 cooperates with the ring 25 in preventing warpage of the brake flange by outward bulging of its circumferential center portions.

Variations in the structure disclosed may be made within the scope of the appended claims.

I claim:

1. A brake drum comprising a generally cylindrical braking flange having an internal cylindrical friction braking face, an open end at one edge of said braking flange, a mounting flange at the opposite end of said braking flange, a plurality of slots opening into said braking flange from said edge thereof at said open end and dividing said braking flange into a plurality of circumferentially-spaced cantilever flange segments, an annular ring circumferentially encircling said braking flange at the margin of said open end radially outward from said braking face, said ring including means concentrically overlapping portions of said flange segments and frictionally engaged with said flange segments to provide for thermal expansion of said segments relative to the ring in a direction circumferentially of the brake drum but resisting radial inward or outward distortion of said segments.

2. A brake drum comprising a generally cylindrical braking flange having an internal friction braking face, an open end at one edge of said braking flange, a mounting flange at the opposite end of said braking flange, a plurality of radial slots opening into said braking flange from said edge at said open end and extending axially through said braking flange and terminating adjacent said opposite end of the braking flange, the slots dividing said braking flange into a plurality of circumferentially spaced arcuate cantilever flange segments, an annular ring circumferentially encircling said flange segments at the external margin of said open end of the brake drum, said ring having an outer annular projection radially overlapping portions of each segment at the open end of the brake drum, a rabbet in each said segment at the edge thereof at the open end of the drum at a location radially outward from said internal braking face of the drum and said ring including an inner annular projection seated in said rabbet and engaged with each segment, said ring providing for thermal expansion of said segments relative to the ring in a direction circumferentially of the brake drum but resisting radial inward and outward distortion of said segments.

3. A brake drum comprising a generally cylindrical braking flange having an internal friction braking face, an open end at one edge of said braking flange, a mounting flange at the opposite end of said braking flange, a plurality of radial slots opening into said braking flange from said edge at said open end of the braking flange, the slots extending axially through said braking flange and terminating adjacent said opposite end of the braking flange, the slots dividing said braking flange into a plurality of circumferentially spaced arcuate cantilever flange segments, an annular ring circumferentially encircling said flange segments at the external margin of said open end of the brake drum, said ring having a generally C cross sectional shape, a rabbet in the external margin of each segment at said edge thereof at the open end of the drum in which the radially inner leg of said C-ring is seated and with the radially outer leg of said C-ring embracing the external surface of said braking flange, both said legs of said C-ring being in frictional interlocking engagement with each segment, said ring providing for thermal expansion of said segments relative to the ring in a direction circumferentially of the brake drum but opposing radial inward and outward distortion of said segments.

4. A brake drum in accordance with claim 3, and further comprising a rigid hoop externally circumferentially encircling said braking flange and frictionally engaged with said brake segments intermediate said ring and said mounting flange, said hoop cooperating with said ring to oppose radial inward and outward distortion of said flange segments.

References Cited in the file of this patent

UNITED STATES PATENTS

| | | |
|---|---|---|
| 1,946,102 | Norton | Feb. 6, 1934 |
| 2,055,244 | Wells | Sept. 22, 1936 |
| 2,081,605 | Sinclair | May 25, 1937 |